United States Patent
Wu et al.

(10) Patent No.: US 6,383,694 B1
(45) Date of Patent: May 7, 2002

(54) METHOD OF MANUFACTURING A COLOR FILTER FOR A REFLECTIVE LIQUID CRYSTAL DISPLAY

(75) Inventors: Yaw-Ting Wu, Taoyuan County; Chun-Hsiang Wen; Shu-Huei Cheng, both of Hsinchu; Ming-Hsiang Chan, Hsinchu County, all of (TW); Jun-Ichi Yasukawa, Kanagawa Pref.; Hajime Kuwahara, Chiba Pref., both of (JP)

(73) Assignee: Sumitomo Chemical Company Limited (JP)

( * ) Notice: Subject to any disclaimer, the term of this patent is extended or adjusted under 35 U.S.C. 154(b) by 0 days.

(21) Appl. No.: 09/648,176

(22) Filed: Aug. 25, 2000

(30) Foreign Application Priority Data

Mar. 27, 2000 (CN) .......................... 089105569

(51) Int. Cl.[7] .......................... G02B 5/20; G02F 1/1335
(52) U.S. Cl. .......................................... 430/7
(58) Field of Search .............................. 430/7; 349/106

(56) References Cited

U.S. PATENT DOCUMENTS

| | | | |
|---|---|---|---|
| 4,786,148 A | 11/1988 | Sekimura et al. | 350/339 |
| 4,812,387 A | 3/1989 | Suzuki et al. | 430/311 |
| 5,085,973 A | 2/1992 | Shimizu et al. | 430/271 |
| 5,214,541 A | 5/1993 | Yamasita et al. | 359/891 |
| 5,214,542 A | 5/1993 | Yamasita et al. | 359/891 |
| 5,641,595 A | * 6/1997 | Hsieh et al. | 430/7 |

FOREIGN PATENT DOCUMENTS

JP 2000-9917 * 1/2000

* cited by examiner

Primary Examiner—John A. McPherson (57) ABSTRACT

A method of manufacturing a color filter for a reflective liquid crystal display is disclosed. The method comprises the following steps: 1) coating a layer of positive photoresist on a reflective layer or reflective substrate, and exposing the photoresist layer to a light via a mask having a fine pixel pattern so as to form at least three exposed regions of different exposed energy in the photoresist layer, 2) Removing one of the existing exposed regions having a largest exposed dose by the use of an alkaline developer solution so as to expose the surface of the electrically conductive reflective substrate corresponding to the removed region; and electrodepositing a color paint on the exposed surface of the reflective substrate to form a color filter layer of one selected color, 3) repeating step 2) to remove the other exposed regions in the photoresist layer and proceeding with an electrodeposition process with another color paint until a color filter layer of all desired colors is completed. Thus, a color filter for a reflective crystal display according to the present method could obtain a uniform thickness, a better flatness, and a pattern of high fineness and have a large degree of freedom in pattern arrangement and the possibility of increased size.

9 Claims, 4 Drawing Sheets

METHOD OF MANUFACTURING A COLOR FILTER FOR A REFLECTIVE LIQUID CRYSTAL DISPLAY

BACKGROUND OF THE INVENTION

1. Field of the Invention

This invention relates to a method of manufacturing a color filter for a reflective liquid crystal display, and more particularly to a method of forming a color filter on a reflective plate or reflective electrode of a reflective liquid crystal display by the use of electrodepositing paint and multilevel-development positive photoresist.

2. Description of the Prior Art

In recent years, a liquid crystal display (LCD) has been widely used in various information and communication apparatuses. Especially for portable information processors, such as notebook computers, personal digital assistants, and mobile phones, some features such as lightweight, low profile, and low power consumption have become essential requirements of portability suitable to consumers. Moreover, a reflective LCD has a quarter of the power consumption for a transmissive LCD due to an absence of a back light source and the reflective LCD has a thickness only half that of the transmissive LCD and a weight only one-third of the latter. Thus, the reflective LCD has become a key component for portable information processors.

A color filter is a key element for the LCD to present a light and lifelike picture. Even if a commercialized multi-color reflective STN-ECB LCD has been proposed (M. Ozeki, et al., SID,96, pp. 107–110), it can only present 4–6 colors and thus functions far less effectively than a reflective LCD which is integrated with a color filter and can achieve a full-color display.

The reflective LCD can be classified into two types in terms of the position of the color filter. One is located on the upper substrate and the other is located on the lower substrate. The one with the color filter, located on the upper substrate, has a structure identical to that in a general transmissive LCD. In detail, a black matrix, a color filter layer, and a protective layer are formed in sequence on a transparent substrate. However, the thickness of the color filter layer in a reflective LCD is thinner than that in a transmissive LCD, due to the fact that an incident light is passed through the color filter layer twice, so as to sustain the brightness of picture. As for the one with the color filter is, located on the lower substrate, a color filter layer is formed directly on the reflective substrate or reflective electrode, in which the existence of a black matrix is dependent upon the necessity of the display module.

The commercialized process for manufacturing a color filter generally comprises five different methods as follows: dyeing, etching, pigment dispersion, electrodeposition, and printing. In the dyeing and etching methods the dye is a main light-filtering material. The dye has advantages such as variety, chromatic uniformity, high dyeability, high chroma, and high light transmissibility, but has disadvantages such as low light-resistibility and low heat-resistibility. Thus, these two methods are gradually superseded by the pigment dispersion and the electrodeposition methods in which pigment is a main filtering material. The pigment has a better light-resistibility and heat-resistibility, and its chroma and light transmissibility can approach the grade of a dye inasmuch as the average diameter of the pigment particle is held under 0.1 $\mu$m by the pigment dispersion technique.

The Pigment dispersion techniques, such as those disclosed in U.S. Pat. Nos. 5,085,973 and 4,786,148, are ones utilizing a photosensitive resin containing pigment dispensed therein and a lithophotography technique to obtain a high resolution and a freedom of arranging pixels. Such a technique can be used to manufacture a color filter for either a transmissive LCD or a reflective LCD. However, this technique has some drawbacks such as (1) low utility rate of material (1%~2%); (2) low suitability for large sizes of glass substrate; (3) several uses of an expensive high precision alignment exposure machine; (4) difficulty in controling the flatness and uniformity of the film, which in turn makes it difficult to control manufacturing costs.

Electrodeposition methods, such as disclosed in U.S. Pat. No. 4,812,387, are implemented by electrodepositing, by means of electrophoresis, the resin and pigment dispersed in water on a transparent electrode plate having a particular pattern. Thus, a light-filtering film having a good flatness and uniform thickness is obtainable. However, in such an electrodeposition method, the pattern of the electrode is limited to a stripe pattern, and thus the arrangement of pixels is limited.

As for the print method, even though it is the least expensive cost of all manufacturing methods, it is generally applied to low-end products rather than products requiring high resolution, due to the fact that it has poorest accuracy in dimension, inferior flatness, and low reliability.

In light of the advantages and drawbacks of the pigment dispersion method and the electrodeposition method, the Nippon Oil Company initially proposed a technique to manufacture the color filter for a transmissive LCD by means of incorporating the electrodeposition method with the lithophotographic method, such as disclosed in U.S. Pat. Nos. 5,214,541 and 5,214,542. The contents of the two patents are incorporated herein by reference. In detail, a mask having at least three regions of different light transmittance is used to obtain, after one exposure, several exposed areas of different exposed doses in a photoresist layer provided on a transparent conductive substrate. Then, developer solutions having different concentrations are used to remove, step by step, the several exposed areas in the photoresist layer, so as to expose a corresponding surface of the transparent conductive substrate. In the meanwhile, each time an exposed region is removed, one of the color filter layers, including a red filter, a green filter, and a blue filter, is electrodeposited on the exposed surface of the transparent conductive substrate. By means of the above method, a very fine pattern, better than that found in a conventional electrodeposition method, is obtainable, and the freedom of pattern arrangement is broadened. In addition, a filter layer having a uniform thickness and a better flatness is also obtainable. However, since an anionic electrodepositing resin is used, which is easy to be affected by a developer solution of high concentrations, the tolerance for the concentration of the developer solution is thus rather narrow. On the contrary, if a cationic electrodepositing resin is used, it is better in alkali-resistibility but will result in drawbacks such as yellowing, which in turn reduces the light transmissibility, and generates black spots on the ITO (Indium tin oxide), a transparent conductive material used as the transparent conductive substrate. Moreover, in comparison with the pigment dispersion method, an ITO layer for electrodepositing is necessary and thus will reduce light transmissibility. Therefore, the above technique still cannot supersede the pigment dispersion method.

SUMMARY OF THE INVENTION

An object of this invention is to provide a method of manufacturing a color filter for a reflective LCD by which a color filter having a large scale, fine pixels, and a better flatness is obtainable, and a large degree of freedom to arrange patterns and control of the thickness of the color filter is possible.

To achieve the above objectives, a method according to the present invention comprises the following steps: (a) coating a positive photoresist layer on a reflective substrate; (b) exposing the photoresist layer to a light via a mask having a pixel pattern such that at least three exposed regions of different exposed energies, with respect to one pixel, are formed in the photoresist layer; (c) removing one of the existing exposed regions, having the largest exposed energy by using an alkaline developer solution, so as to expose the surface of the reflective substrate corresponding to the removed region; (d) electrodepositing a paint, having a selected color on the exposed surface of the reflective substrate, so as to form a color filter layer of one selected color; and (e) repeating the steps (c) and (d) until a color filter layer consisting of all desired colors is obtained.

By means of the above method, since the color filter is directly formed on the reflective substrate or reflective electrode of the reflective LCD by an incorporation of the electrodeposition method with the lithography method, the reduction in light transmissibility due to a provision of an ITO layer is no longer considerable in comparison with the conventional pigment dispersion method. Moreover, both the anionic paint and the cationic paint are available for electrodeposition, and thus the flexibility of the positive photoresistivity in a lithography process is increased. Furthermore, merits such as a large degree of freedom in pattern arrangement, a uniform thickness, a better flatness, and a highly fine pattern are maintained.

The above advantages and features of this invention can be easily comprehended by persons skilled in the art through the drawings and detailed explanations.

DETAILED DESCRIPTIONS OF EMBODIMENTS

Referring now to the drawings, preferred embodiments of the present invention will be explained.

Figure 1:
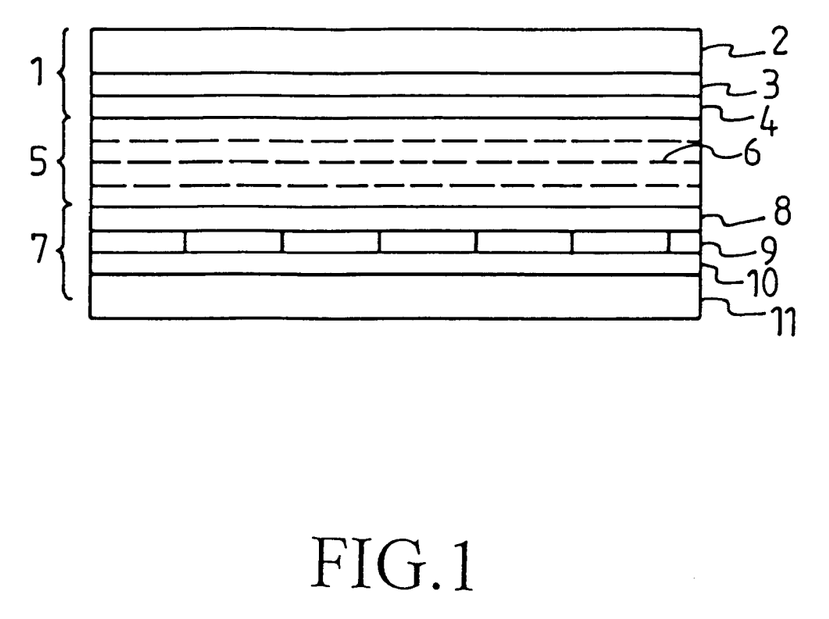
FIG. 1 is a sectional view illustrating the structure of a reflective LCD in which a color filter is located on a lower substrate.

FIG. 1 illustrates a sectional view of the structure of a representative reflective LCD to which the present invention can be applied. As shown in FIG. 1, the LCD mainly comprises an upper board 1, a liquid crystal layer 5, and a lower board 7. The upper board 1 comprises a transparent substrate 2, a transparent electrode 3, and an alignment layer 4. The liquid crystal layer 5 contains liquid crystal 6. The lower board 7 comprises an alignment layer 8, a color filter 9, a reflective layer 10, and a lower insulative substrate 11. The reflective layer 10 can be a reflective electrode. Otherwise, the reflective layer 10 can only be a layer for reflecting light while a counter electrode (not shown) is provided above the color filter 9 for driving liquid crystal 6.

With respect to the above structure, the method of manufacturing a color filter for a reflective LCD under the use of a electrodepositing paint and a positive photoresistivity in accordance with the present invention comprises the following steps:

1. coating a layer of positive photoresist on a reflective layer or reflective substrate, and exposing the photoresist layer to a light via a mask having a fine pixel pattern so as to form at least three exposed regions of different exposed energies in the photoresist layer;

2. removing one of the existing exposed regions having the largest exposed volume by the use of an alkaline developer solution so as to expose the surface of the electrically conductive reflective substrate corresponding to the removed region; and electrodepositing a color paint on the exposed surface of the reflective substrate to form a color filter layer of one selected color; and 3. repeating step 2. to remove the other exposed regions in the photoresist layer and proceeding with an electrodeposition process using another color paint until a color filter layer of all desired colors is completed.

In the above process, the step of forming at least three exposed regions of different exposed doses in the photoresist layer can be implemented by the following two kinds of procedures. In the first procedure, a mask having at least three regions of different light transmittance is utilized and only one exposure is conducted. In the second procedure, a mask having a light transmitting area of at most one-third of the pixel region is utilized. At least three exposed regions with different exposed energies are formed after having the mask to be exposed at different locations with different exposed energies.

The step of removing the photoresist layer also comprises various procedures. For example, a developer solution having the same concentration can be used each time to remove the photoresist layer. Otherwise, the concentration of the developer solution can be gradually increased over time. Moreover, when a developer solution of the same concentration is used for all the exposed regions, different developing durations can be adopted for different regions. Alternatively, an additional exposure procedure for all other exposed regions can be implemented after the highest exposed region has been developed and removed, so that the other exposed regions can be developed in the same duration.

Moreover, the process of manufacturing a color filter in accordance with the present invention can be specified into several embodiments such as:

1) excluding the provision of a black matrix;

2) including the provision of a black matrix; and 3) including the formation of a reflective electrode array.

The detail steps with respect to the above embodiments are described in the reference with the drawings as follows:

1.1 The embodiment of manufacturing a color filter in which the provision of a black matrix is not included.

Figure 2:
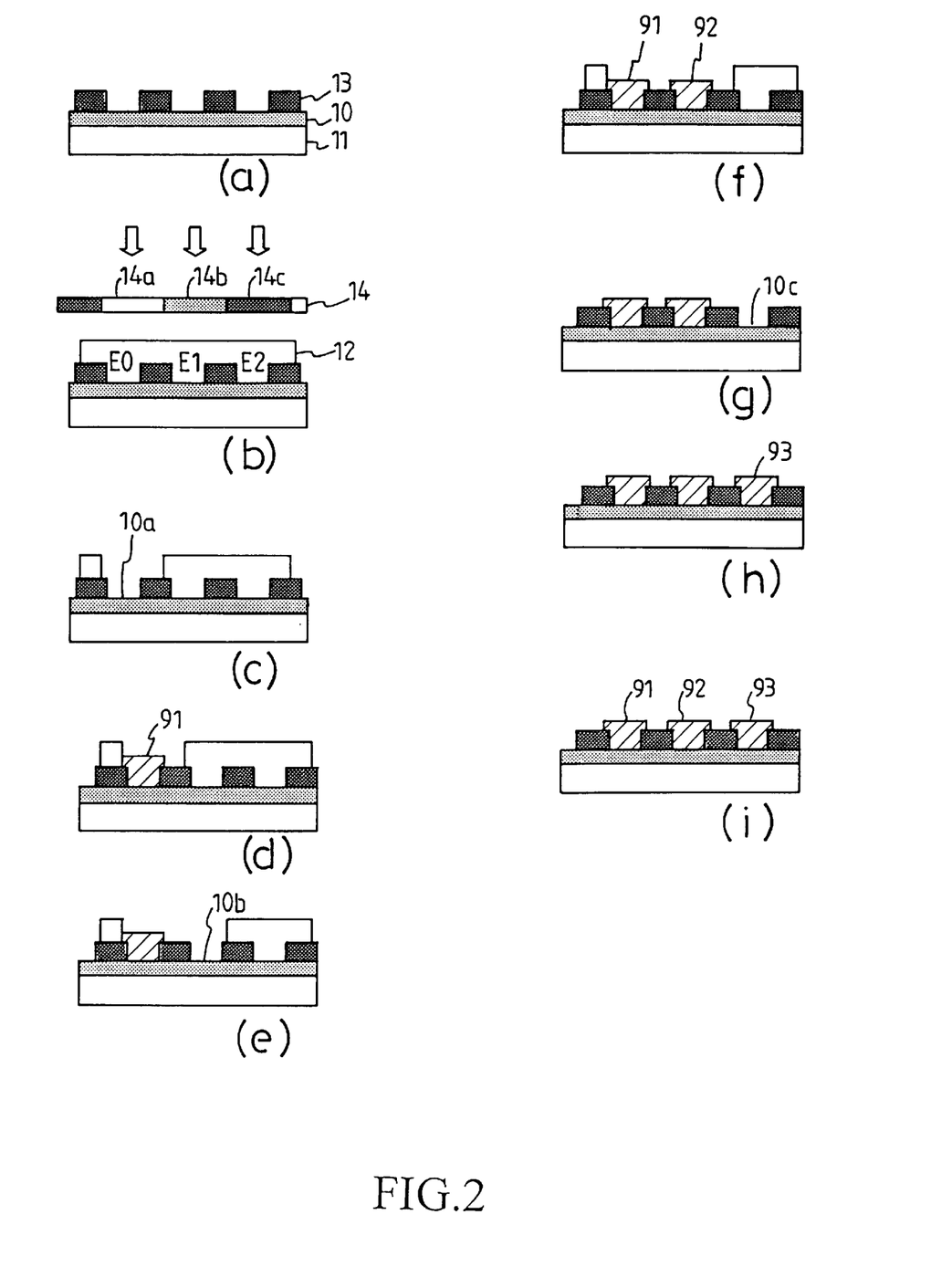
FIG. 2 is a diagram showing a step by step process for producing a color filter, according to an embodiment of the present invention.

FIGS. 2(*a*) to 2(*i*) are schematic sectional views respectively showing the various steps of a preferred embodiment of the process for manufacturing a color filter, in which the provision of a black matrix is not included. The color filter in the first embodiment comprises the following steps:

a) Preparing an insulative substrate 11 on which a metal reflective layer 10 and a black matrix 13 is formed in advance, as shown in FIG. 2(*a*).

b) Coating a layer of positive photoresist layers 12 on the reflective layer 10 and the black matrix 13, and then exposing the positive photoresist layer 12 to a light via a mask 14 having three pixel regions of different light transmittance wherein the pixel regions 14a, 14b, 14c have light transmittances T0, T1, T2 respectively and a relationship of T0>T1>T2 so that three exposed regions E0, E1, E2 of different exposed energies are formed in the photoresist layer 12, as shown in FIG. 2(b).

c) Removing the exposed region E0 in the photoresist layer 12 by the use of a developer solution of a proper concentration so as to expose a surface 10a of the reflective layer 10 corresponding to the exposed region E0, as shown in FIG. 2(c).

d) Electrodepositing a colored resin on the exposed surface 10a of the reflective layer 10 and thus completing the provision of a first-color filter layer 91, as shown in FIG. 2(d).

e) Removing the exposed region E1 from the photoresist layer 12 by the use of a developer solution of a proper concentration so as to expose a surface 10b of the reflective layer 10 corresponding to the exposed region E1, as shown in FIG. 2(e).

f) Electrodepositing a colored resin on the exposed surface 10b of the reflective layer 10 and thus completing the provision of a second-color filter layer 92, as shown in FIG. 2(f).

g) Removing the exposed region E2 from the photoresist layer 12 by the use of a developer solution of a proper concentration so as to expose a surface 10c of the reflective layer 10 corresponding to the exposed region E2, as shown in FIG. 2(g).

h) Electrodepositing a colored resin on the exposed surface 10c of the reflective layer 10 and thus finishing the provision of a third-color filter layer 93, as shown in FIG. 2(h).

1.2 The embodiment of manufacturing a color filter in which the provision of a black matrix is included.

Figure 3:
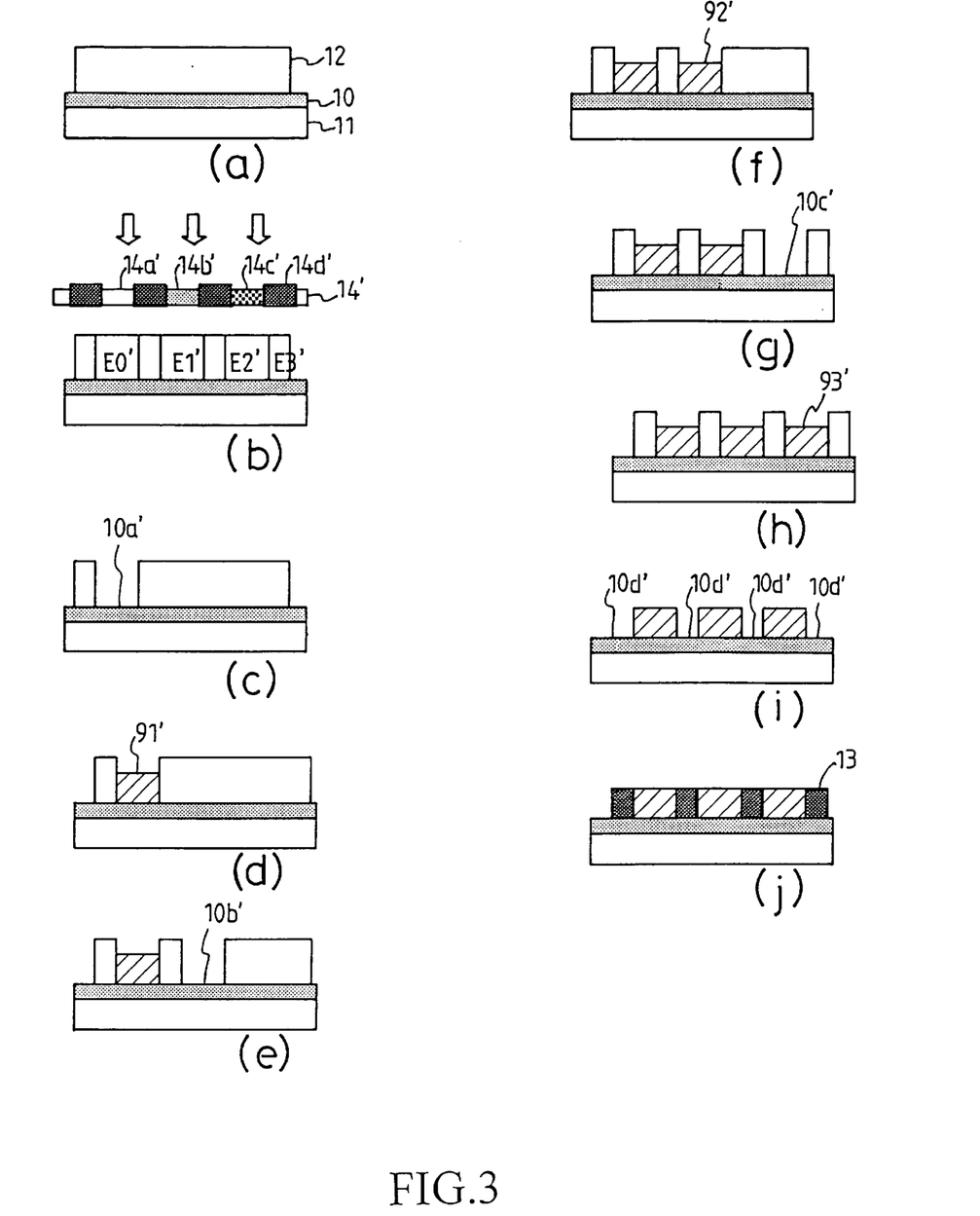
FIG. 3 is a diagram showing a step by step process for producing a color filter and a black matrix, according to another embodiment of the present invention.

FIGS. 3(a) to 3(j) are schematic section of views respectively showing the various steps of a preferred embodiment of the process for manufacturing a color filter, in which the provision of a black matrix is included. The color filter in the second embodiment comprises the following steps:

a) Preparing an insulative substrate 11 on which a metal reflective layer 10 is formed, and then coating a layer of positive photoresistance 12' on the reflective layer 10, as shown in FIG. 3(a).

b) Exposing the positive photoresist layer 12' to a light via a mask 14' having four pixel regions of different light transmittance wherein the pixel regions 14a, 14b, 14c, 14d have light transmittances T0, T1, T2, T3 respectively and a relationship of T0>T1>T2>T3 so that four exposed regions E0', E1', E2', E3' of different exposed volume are formed in the photoresist layer 12', as shown in FIG. 3(b).

c) Removing the exposed region E0' from the photoresist layer 12' by the use of a developer solution of a proper concentration so as to expose a surface 10a' of the reflective layer 10 corresponding to the exposed region E0', as shown in FIG. 3(c).

d) Electrodepositing a colored resin on the exposed surface 10a' of the reflective layer 10 and thus finishing the provision of a first-color filter layer 91', as shown in FIG. 3(d).

e) Removing the exposed region E1' from the photoresist layer 12' by the use of a developer solution of a proper concentration so as to expose a surface 10b' of the reflective layer 10 corresponding to the exposed region E1', as shown in FIG. 3(e).

f) Electrodepositing a colored resin on the exposed surface 10b' of the reflective layer 10 and thus finishing the provision of a second-color filter layer 92', as shown in FIG. 3(f).

g) Removing the exposed region E2' from the photoresist layer 12' by the use of a developer solution of a proper concentration so as to expose a surface 10c' of the reflective layer 10 corresponding to the exposed region E2', as shown in FIG. 3(g).

h) Electrodepositing a colored resin on the exposed surface 10c' of the reflective layer 10 and thus finishing the provision of a third-color filter layer 93', as shown in FIG. 3(h).

i) Removing the exposed region E3' from the photoresist layer 12' by the use of a developer solution of a proper concentration so as to expose a surface 10d' of the reflective layer 10 corresponding to the exposed region E3', as shown in FIG. 3(i).

j) Forming a black matrix 13' on the exposed surface 10d' of the reflective layer 10, as shown in FIG. 3(j).

1.3 The embodiment of manufacturing a color filter in which the formation of a reflective electrode is included.

Figure 4:
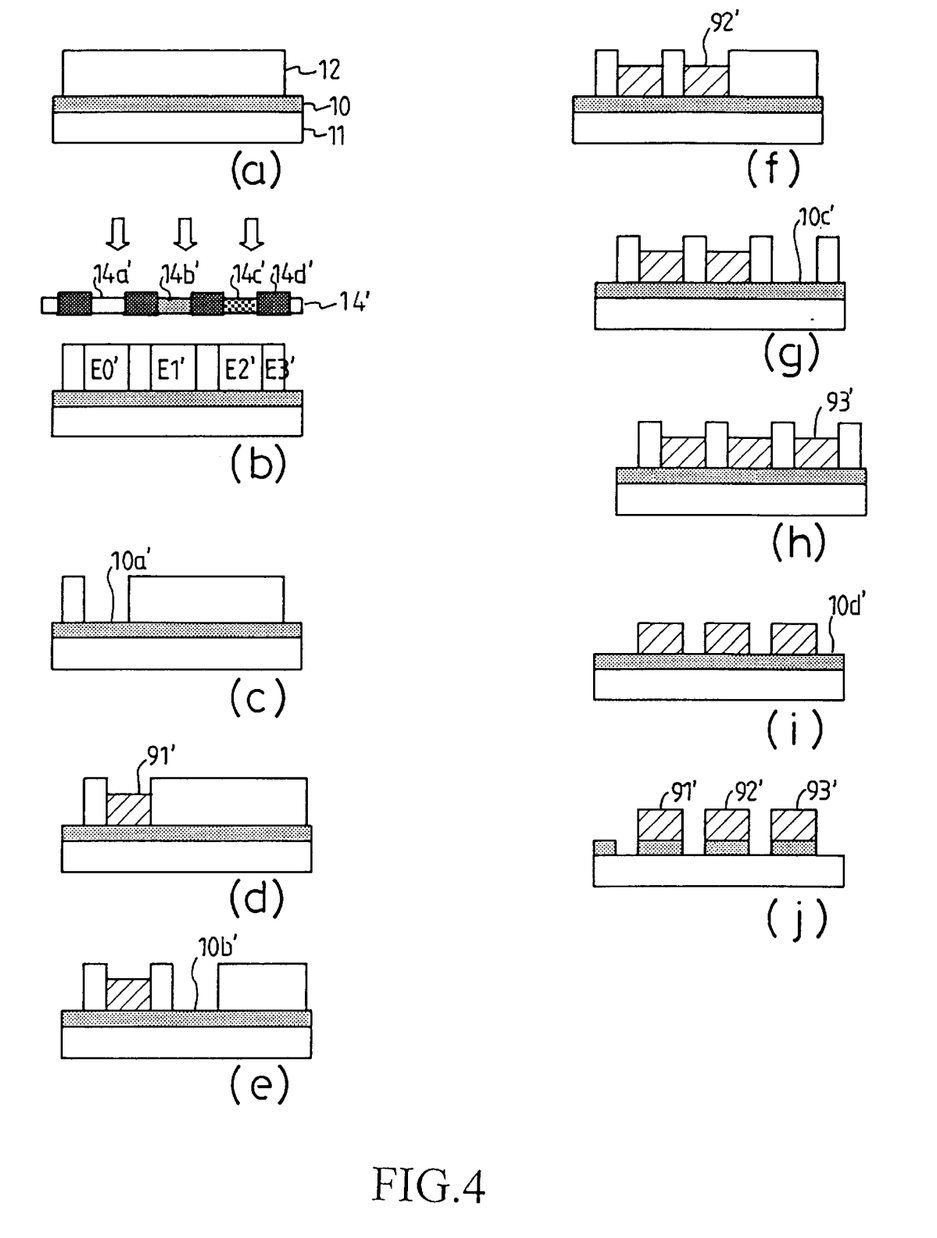
FIG. 4 is a diagram showing a step by step process for producing a color filter and a reflective electrode, according to another embodiment of the present invention.

FIGS. 4(a) to 4(j) are schematic sectional views respectively showing the various steps of a preferred embodiment of the process for manufacturing a color filter, in which the formation of a reflective electrode is included. The color filter in the third embodiment comprises the following steps:

a) Preparing an insulative substrate 11 on which a metal reflective layer 10 is formed, and then coating a layer of positive photoresist 12' on the reflective layer 10, as shown in FIG. 4(a).

b) Exposing the positive photoresist layer 12' to a light via a mask 14' having four pixel regions of different light transmittance wherein the pixel regions 14a, 14b, 14c, 14d have light transmittances T0, T1, T2, T3 respectively and a relationship of T0>T1>T2>T3 so that four exposed regions E0', E1', E2', E3' of different exposed volume are formed in the photoresist layer 12', as shown in FIG. 4(b).

c) Removing the exposed region E0' from the photoresist layer 12' by the use of a developer solution of a proper concentration so as to expose a surface 10a' of the reflective layer 10 corresponding to the exposed region E0', as shown in FIG. 4(c).

d) Electrodepositing a colored resin on the exposed surface 10a' of the reflective layer 10 and thus finishing the provision of a first-color filter layer 91', as shown in FIG. 4(d).

e) Removing the exposed region E1' from the photoresist layer 12' by the use of a developer solution of a proper concentration so as to expose a surface 10b' of the reflective layer 10 corresponding to the exposed region E1', as shown in FIG. 4(e).

f) Electrodepositing a colored resin on the exposed surface 10b' of the reflective layer 10 and thus finishing the provision of a second-color filter layer 92', as shown in FIG. 4(f).

g) Removing the exposed region E2' from the photoresist layer 12' by the use of a developer solution of a proper concentration so as to expose a surface 10c' of the reflective layer 10 corresponding to the exposed region E2', as shown in FIG. 4(g).

h) Electrodepositing a colored resin on the exposed surface 10c' of the reflective layer 10 and thus finishing the provision of a third-color filter layer 93', as shown in FIG. 4(h).

i) Removing the exposed region E3' from the photoresist layer 12' by the use of a developer solution of a proper concentration so as to expose a surface 10d' of the reflective layer 10 corresponding to the exposed region E3', as shown in FIG. 4(i).

j) Etching the portion of the reflective layer 10 corresponding to the exposed surface 10d' so as form a reflective electrode array, as shown in FIG. 4(j).

In the above processes, the positive photoresistant is a multi-developing positive photoresistant. In such a photoresistant, several exposed regions of different exposed volume will be developed progressively with respect to the same developer solution. In specific, the positive photoresistant will result in a change in dissolution rate under exposure to light, and can be developed by an alkaline solution or solvent. Moreover, the positive photoresistant has a high reliability relating to the fineness of the pattern formed therein and a high accuracy relating to the size thereof. By selecting one type of positive photoresistant having a high contrast, a thickness reduction in an unexposed region or an underexposed region will be minimized. The positive photoresistant is generally a composition consisting of a novolac resin and a quinonediazide compound. For example, the positive photoresistant used in the present invention can be a general positive photoresist or electrodepositing positive photoresist, or a thermal-curable positive photoresist or electrodepositing positive photoresist containing a dye or pigment.

The coating of the photoresist layer can be implemented by means of spraying, dip-coating, screen-printing, roll-coating, or spin-coating. The thickness of the photoresist layer is general in a range of 1–10 $\mu$m, and is preferred in a range of 1.5–5 $\mu$m.

During a process of lithography, a full-scale exposure energy can be 30–1500 mJ/cm$^2$, and the pattern for each pixel can be any type of array such as a type of stripe, a type of non-stripe (such as mosaic, triangular (with respect to red, green, blue), or a type of random pattern.

In terms of the aforesaid mask having three different regions, the light transmittances of the three regions can be a range of 100%–40%, 85%–20%, 70%–0%, and is preferably a range of 100%–70%, 70%–40%, 40%–0%, respectively. In terms of the type of mask having four different regions, the light transmittance of the four regions can be a range of 100%–40%, 85%–20%, 70%–5%, 50%–0%, and is preferably a range of 100%–80%, 80%–50%, 50%–30%, 30%–0%, respectively. In spite of the type of mask being used, a step of exposing the entire photoresist layer to a light can be performed before the step of developing either a second, a third, or a fourth exposed region, if necessary, so as to increase the tolerance for developing each exposed region.

The developer solution for the multi-developing positive photoresist used in the present invention is an alkaline developer solution or solvent, such as a water solution of sodium carbonate, sodium hydrogen carbonate, potassium carbonate, potassium hydrogen carbonate, sodium silicate, sodium hydroxide, potassium hydroxide, tetraalkyl ammonium hydroxide, or the mixtures thereof. However, any other type of developer solution is also available. Moreover, the concentration of the developer solution ranges between 0.2% and 5%, the temperature for developing is general at 10–70° C., preferably at 15–40° C., and the duration for developing is about 5–600 seconds.

The electrodepositing paint serving as a color filter can be either an anionic or a cationic type of electrodepositing paint. Such a paint mainly consists of an anionic or cationic electrodepositing resin, curing agent, coloring agent, solvent, and water. If necessary, a photosensitive monomer and a photo-initiator or the other additive can also be added. The anionic resin consists of a resin such as an acrylic resin containing an acid group (carboxylic or sulfonic group), a melamine resin, a polyimide resin, an epoxy resin, or a polyester resin, and a neutralizing agent such as ammonia, trimethylamine, triethylamine, diethylamine, dimethyl ethanol amine, diethyl ethanol amine. The cationic resin consists of a resin such as an acrylic resin containing an acid group (carboxylic or sulfonic group), a melamine resin, a polyimide resin, an epoxy resin, or a polyester resin, and a neutralizing agent such as formic acid, acetic acid, lactic acid.

The curing agent is selected from the group consisting of a melamine resin and other resin capable of performing heat-linkage.

The solvent is used to promote the dispersion of the coloring agent in the electrodepositing solution and its stability. The solvent can be selected from the group consisting of glycol ethers, ketones, ethers, alcohols, esters, acidamides, and any mixtures thereof.

The coloring agent can be a dye, pigment, or a mixture thereof. The pigment can be selected from the group of consisting of azo lake organic pigments, quinacridone organic pigments, phthalocyanine organic pigments, isoindoline organic pigments, anthraquinone organic pigments, thioindigo organic pigments, chrome yellow, chrome blue, iron oxide, chrome vermilion, chrome green, ultramarine, emerald green, titanium white, carbon black, and any mixtures thereof. The dye can be selected from the group consisting of axo dyes, anthraquinone dyes, benzodifuranone dyes, condensed methane dyes, and mixtures thereof.

By means of the use of the electrodepositing paint and the multi-developed positive photoresist, as well as the use of the electrodeposition method and lithophotography method mentioned above, the color filter formed on the reflective layer or electrode has many merits such as a large degree of freedom in a pattern arrangement, a uniform thickness, a better flatness, and a pattern having high fineness, as well as a possibility for a big size. Such a manner is therefore suitable for producing a color filter for any type of reflective LCDs especially in the light of an improvement in product quality and a decreas in manufacturing cost.

The present invention will now be described more specifically with reference to the following examples.

EXAMPLE 1

The provision of an electrodepositing polyester resin

For providing an electrodepositing polyester resin, polymerization action including a general esterification and condensation reaction, is used, in which the main monomer and solvent to be used is proportioned as the following weight percent:

Component weight percent

| | |
|---|---|
| Neopentyl glycol | 24.53 |
| Adipic acid | 3.25 |
| Isophthalic acid | 7.95 |
| Isodecanol | 14.40 |
| Trimellitic anhydride | 25.81 |

-continued

| | |
|---|---|
| 2-butyl cellosolve | 5.00 |
| 2-butanol | 20.00 |

The above components having the above proportion are added into a reactor and stirred under a nitrogen atmosphere. After a polymerization reaction including the stages of esterification, decompression, and dehydration, a resin solution having the following property is obtained.

| | |
|---|---|
| Non-volatile content (150° C., 1 Hr, wt %) | 75.4 |
| Acid value (mg KOH/g solid) | 48.7 |
| Viscosity | 45.2 |

EXAMPLE 2

The provision of the electrodepositing paint

The components of a polyester resin electrodeposition paint comprises the follows:

| Components | A-1 | A-2 | A-3 |
|---|---|---|---|
| Anionic polyester resin | 95.0 | 95.0 | 95.0 |
| Melamine resin (Nikarakku MX-40) | 18.0 | 18.0 | 18.0 |
| 2-butyl cellosolve | 25.0 | 25.0 | 25.0 |
| 2-ethyl cellosolve | 5.0 | 5.0 | 5.0 |
| n-butanol | 18.0 | 18.0 | 18.0 |
| triethylamine | 2.5 | 2.5 | 2.5 |
| deionized water | 813.5 | 813.5 | 813.5 |
| phthalocyanine blue | 5.0 | | |
| phthalocyanine green | | 5.0 | |
| azo lake pigment | | | 5.0 |
| total | 1000 | 1000 | 1000 |

The steps of providing the polyester resin electrodeposition paint

1) Adding, by weight, the anionic polyester resin solution, melamine resin, 2-butyl cellosolve, 2-ethyl cellosolve, n-butanol, and triethylamine into a container and stirring and mixing the same so as to result in a mixture;
2) Adding, by weight, pigment into the container and stirring and mixing the same so as to obtain a mixture;
3) Grinding and dispersing the obtained mixture by grinding grain of a diameter ranging between 0.8 μm to 1.2 μm;
4) Adding the deionized water into the mixture and stirring the resulting mixture until emulsification is achieved;
5) Filtering the emulsion with a filter having a mesh less than 5 μm.

EXAMPLE 3

Manufacturing the color filter along with the reflective electrode by means of the aforesaid first exposure procedure First, on the surface of a glass substrate, a reflective layer of a 1000 angstrom thickness is formed by means of aluminum sputtering. Next, on the reflective layer, a layer of weak-alkaline-developed positive photoresist, as disclosed in U.S. Pat. No. 5,645,970, of a 2.2 μm thickness is coated. The positive photoresist layer then is exposed to a light through a mask which has a fine pixel pattern including four regions of different light transmittances. Each of the four regions allow the passage of one of the exposure energies of 300, 180, 120, and 0 mJ/cm$^2$ (100%, 60%, 40%, or 0%), so as to form four different exposed regions in the photoresist layer.

Continuously, the exposed region in the photoresist layer which is exposed to an energy of 300 mJ/cm$^2$ (100%) is developed and removed by a developer solution containing 0.4% $Na_2SiO_3$. Next, the surface of the reflective layer corresponding to the removed region is electrodeposited with a red color under 25° C. at 40V for 10 seconds. After electrodeposition, a cleaning process by means of a deionized water and a baking process at 90° C. for 10 minutes are performed. Next, a developer solution containing 0.7% $Na_2SiO_3$, having a higher concentration, is used to develop and remove the region exposed to an energy of 180 mJ/cm$^2$ (60%), and then an electrodeposition process and a baking process under the condition identical to the former are performed to achieve a green color. Next, a developer solution containing 1.0% $Na_2SiO_3$, having an even higher concentration, is used to develop and remove the region exposed to an energy of 120 mJ/cm$^2$ (40%), and then an electrodeposition process and a baking process under the condition identical to the former are performed to achieve a blue color. To this stage, an exposure to an energy of 250 mJ/cm$^2$ may be performed with respect to the entire photoresist, and a developer solution containing 0.5% $Na_2SiO_3$ is used to develop and remove the residual region, one being exposed to a zero exposure energy, so as to expose the portion of reflective layer corresponding to the residual region. Next, the color filter consisting of three colors is completely cured under 260° C. for one hour. Finally, the exposed reflective layer is etched so as to form a reflective electrode having a predetermined array. Thus, a color filter along with a reflective electrode array is manufactured.

EXAMPLE 4

Manufacturing the color filter by means of the aforesaid second exposure procedure First, on the surface of a glass substrate, a reflective layer of a 1000 angstrom thickness is formed by means of aluminum sputtering, a black matrix is formed and then on the reflective layer. Next, on the reflective layer and the black matrix, a layer of weak-alkaline-developed positive photoresist, as disclosed in U.S. Pat. No. 5,645,970, of a 2.2 μm thickness is coated. The positive photoresist then is exposed three times to a light through a mask having a transmitting region sized one-third of a predetermined pixel pattern. In detail, after one exposure, the position of the mask is shifted a distance fitting one-third of the predetermined pixel pattern. Moreover, the three exposure energies are respectively set as 250, 150, 50 mJ/cm$^2$ (100%, 60%, 20%). Thus, there are three different exposed regions, i.e., the first, second, and third regions, formed in the photoresist, being exposed to energies of 250, 150, 50 mJ/cm$^2$ respectively.

Continuously, a developer solution containing 0.5% $Na_2SiO_3$ is used to develop and remove the exposed region in the photoresist which is exposed to energy of 250 mJ/cm$^2$ (100%). Next, the surface of the reflective layer corresponding to the extracted region is electrodeposited with a red color at a temperature of 25° C. and a voltage of 40V for 10 seconds. After electrodeposition, a cleaning process by means of a s deionized water and a baking process at 90° C. for 10 minutes are performed. Next, the entire photoresist is exposed to a light of 100 mJ/cm$^2$ energy, so that the energies exposed in the second and the third regions (60%, 20%) are accumulated to degrees of 250 mJ/cm$^2$ (100%) and 150 mJ/cm$^2$ (60%), respectively. The same developer solution contain 0.5% $Na_2SiO_3$ is used to develop and remove the second region, i.e., the completely exposed region, and then a process of electrodeposition and baking under a condition identical to the former is performed to achieve a green color. Next, the entire photoresist is exposed to a light of 100 mJ/cm$^2$ energy again, so as to make the energy exposed in the third region (60%) be accumulated to a degree of 250 mJ/cm$^2$ (100%). The same developer solution containing 0.5% Na$_2$SiO$_3$ is used to develop and remove the third region, and then a process of electrodeposition and baking under a condition identical to the former is performed to achieve a blue color. Lastly, the residual photoresist is exposed to a light of 100 mJ/cm$^2$ energy, and developed and removed by the same developer solution containing 0.5% Na$_2$SiO$_3$. Furthermore, the color filter consisting of three colors is cured at 260° C. for one hour, and thus the color filter is completed.

From the embodiments of this invention thus described, it will be obvious that the present invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method of manufacturing a color filter for a reflective liquid crystal display, comprising the following steps of:

(a) coating a positive photoresist layer on a reflective substrate;

(b) exposing the photoresist layer to a light via a mask having a pixel pattern such that at least three exposed regions of different exposed energies are formed in the photoresist layer;

(c) removing the photoresist layer on one of the existing exposed regions having a largest exposed energy by the use of developer solution so as to expose a surface of the reflective substrate corresponding to the removed region;

(d) electrodepositing a paint having a selected color on the exposed surface of the reflective substrate so as to form a color filter layer having the same selected color;

(e) exposing the entire photoresist layer to a light;

(f) repeating steps (c) to (e) until a color filter layer consisting of all desired colors is obtained, wherein the concentration of the developer solution is constant every time in step (c); and (g) etching the reflective substrate so as to form an array of reflective electrodes.

2. The method as claimed in claim 1, wherein the reflective substrate in step (a) is provided with a black matrix in advance.

3. The method as claimed in claim 1, wherein the reflective substrate is a metal film having high reflectivity and is made of a material selected for the group consisting of aluminum, silver, chromium, the mixture thereof, and the alloy thereof.

4. The method as claimed in claim 1, wherein in step (b) the photoresist layer is formed with four exposed regions of different exposed energies, and when the color filter consisting of all the desired colors is obtained, the process further comprises a step identical to step (c) above and the following step:.

(f) forming a black matrix on the exposed surface of the reflective substrate.

5. The method as claimed in claim 1, wherein at least three exposed regions are formed by the use of a mask having at least three regions of different light transmittances during exposure.

6. The method as claimed in claim 5, wherein the mask is provided with three regions of different light transmittances set as 100–70%, 70–40%, 40–0%, respectively.

7. The method as claimed in claim 5, wherein the mask is provided with four regions of different light transmittances set as 100–80%, 80–50%, 50–30%, 30–0% respectively.

8. The method as claimed in claim 1, wherein at least three exposed regions are formed by exposing and shifting a mask having a transmitting region sized at most one-third of all the regions with different exposed energies, several times.

9. The method as claimed in claim 1, wherein the concentration of the developer solution ranges between 0.2% and 0.5% and the photoresist layer is developed at 15–40° C. for 5–600 seconds.

* * * * *

UNITED STATES PATENT AND TRADEMARK OFFICE
CERTIFICATE OF CORRECTION

PATENT NO. : 6,383,694 B1
DATED : May 7, 2002
INVENTOR(S) : Yaw-Ting et al.

It is certified that error appears in the above-identified patent and that said Letters Patent is hereby corrected as shown below:

<u>Title page,</u>
Item [73], the Assignee incorrectly reads "Sumitomo Chemical Company Limited (JP)" and should correctly read -- Industrial Technology Research Institute, of Taiwan, China; and Sumitomo Chemical Company, Limited of Osaka, Japan --.

Signed and Sealed this

Seventeenth Day of September, 2002

Attest:

JAMES E. ROGAN
Attesting Officer     Director of the United States Patent and Trademark Office